United States Patent
Wang et al.

(10) Patent No.: US 11,139,878 B2
(45) Date of Patent: Oct. 5, 2021

(54) GROUP BASED BEAM REPORTING AND CHANNEL STATE INFORMATION REFERENCE SIGNAL CONFIGURATION IN NEW RADIO SYSTEMS

(71) Applicant: Apple Inc., Cupertino, CA (US)

(72) Inventors: Guotong Wang, Beijing (CN); Yushu Zhang, Beijing (CN); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/643,062

(22) PCT Filed: Sep. 10, 2018

(86) PCT No.: PCT/CN2018/104862
§ 371 (c)(1),
(2) Date: Feb. 28, 2020

(87) PCT Pub. No.: WO2019/047953
PCT Pub. Date: Mar. 14, 2019

(65) Prior Publication Data
US 2020/0336188 A1    Oct. 22, 2020

Related U.S. Application Data

(63) Continuation of application No. PCT/CN2017/101036, filed on Sep. 8, 2017, and a continuation of application No. PCT/CN2017/102023, filed on Sep. 18, 2017.

(51) Int. Cl.
*H04K 1/10* (2006.01)
*H04L 27/28* (2006.01)
*H04B 7/06* (2006.01)
*H04B 7/0404* (2017.01)
*H04B 7/08* (2006.01)

(52) U.S. Cl.
CPC ......... *H04B 7/0632* (2013.01); *H04B 7/0404* (2013.01); *H04B 7/0628* (2013.01); *H04B 7/088* (2013.01)

(58) Field of Classification Search
CPC .. H04B 7/0632; H04B 7/0404; H04B 7/0628; H04B 7/088; H04B 7/0882; H04B 17/318
USPC .......... 375/260, 346, 267, 299, 347
See application file for complete search history.

(56) References Cited

U.S. PATENT DOCUMENTS

| | | | |
|---|---|---|---|
| 9,379,873 B2 | 6/2016 | Kang et al. | |
| 2019/0305838 A1* | 10/2019 | Davydov | H04B 17/318 |
| 2020/0059290 A1* | 2/2020 | Pan | H04B 7/0882 |

FOREIGN PATENT DOCUMENTS

| | | |
|---|---|---|
| EP | 2945414 A1 | 11/2015 |
| WO | WO 2017053007 A1 | 3/2017 |

OTHER PUBLICATIONS

China Unicom, "Discussion on group based beam reporting", 3GPP TSG RAN WG1 NR Ad-Hoc#2. R1-1711336, Jun. 30, 2017, four pages.

(Continued)

*Primary Examiner* — Phuong Phu
(74) *Attorney, Agent, or Firm* — Kowert, Hood, Munyon, Rankin & Goetzel, P.C.

(57) ABSTRACT

Embodiments of the present disclosure describe methods and apparatuses for group based beam reporting and channel state information reference signal configuration in new radio systems.

20 Claims, 13 Drawing Sheets

(56) References Cited

OTHER PUBLICATIONS

Intel Corporation, "On Beam State Reporting", 3GPP TSG-RAN WG1 #88, R1-1702197, Feb. 17, 2017, six pages.
Nokia et al., "On beam grouping and reporting", 3GPP TSG-RAN WG1 Meeting #89, R1-1708907, May 19, 2017, 12 pages.
Extended European Search Report for European Application No. 18853554.6, dated Apr. 7, 2021, 11 pgs.
Lenovo et al.: "DL beam measurement and reporting", 3GPP Draft; R1-1712671_Beam_Report, 3RD Generation Partnership Project (3GPP), Mobile Competence Centre; 650, Route Des Lucioles; F-06921 Sophia-Antipolis Cedex; France, vol. RAN WG1, No. Prague, PR. Czech; Aug. 21, 2017-Aug. 25, 2017, Aug. 20, 2017 (Aug. 20, 2017), 5 pgs.
SAMSUNG: "Remaining details on QCL assumptions for DMRS antenna ports", 3GPP Draft; R1-1707913-FECOMP QCL SAM, 3RD Generation Partnership Project (3GPP), Mobile Competence Centre 350, Route Des Lucioles; F-06921 Sophia-Antipolis Cedex; France, vol. Ran WG1, No. Hangzhou, China; May 15, 2017-May 19, 2017, May 14, 2017 (May 14, 2017), 1 pg.
Nokia et al.: "Summary of offline QCL discussion", 3GPP Draft; R1-1715293, 3RD Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 26, 2017 (Aug. 26, 2017), 3 pgs.

* cited by examiner splitting or causing to split downlink transmission beams into different groups reporting or causing to report information on quality of downlink transmission beams to next generation node (gNB)

indicating or causing to indicate relationship between two reporting instances

FIG. 12 indicating or causing to indicate to a user equipment (UE) a downlink transmission beam to be used by the UE delivering or causing to deliver downlink transmission beams grouping information to the UE performing or causing to perform a refinement procedure

GROUP BASED BEAM REPORTING AND CHANNEL STATE INFORMATION REFERENCE SIGNAL CONFIGURATION IN NEW RADIO SYSTEMS

RELATED APPLICATION

This application is the U.S. National Stage of International Application No. PCT/CN2018/104862 filed on Sep. 10, 2018, which claims priority to PCT Application Number PCT/CN2017/101036 filed Sep. 8, 2017 and PCT Application Number PCT/CN2017/102023 filed Sep. 18, 2017. The specifications of said applications are hereby incorporated by reference in their entirety.

FIELD

Embodiments of the present disclosure generally relate to the field of networks, and more particularly, to apparatuses, systems, and methods for control signaling for beam management in cellular networks.

BACKGROUND

Beamforming may be used at both the next Generation Node B ("gNB") side and the user equipment ("UE") side in a fifth generation (5G) new radio system. Beam management may be performed in both downlink and uplink to maintain the gNB/UE beams for communication.

BRIEF DESCRIPTION OF THE DRAWINGS

FIG. 12 depicts a process performed by the electronic device of FIGS. 1, 2, 3, and/or FIG. 6.

FIG. 13 depicts a process performed by the electronic device of FIGS. 1, 2, 3, and/or FIG. 6.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the phrases "A or B," "A and/or B," and "A/B" mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
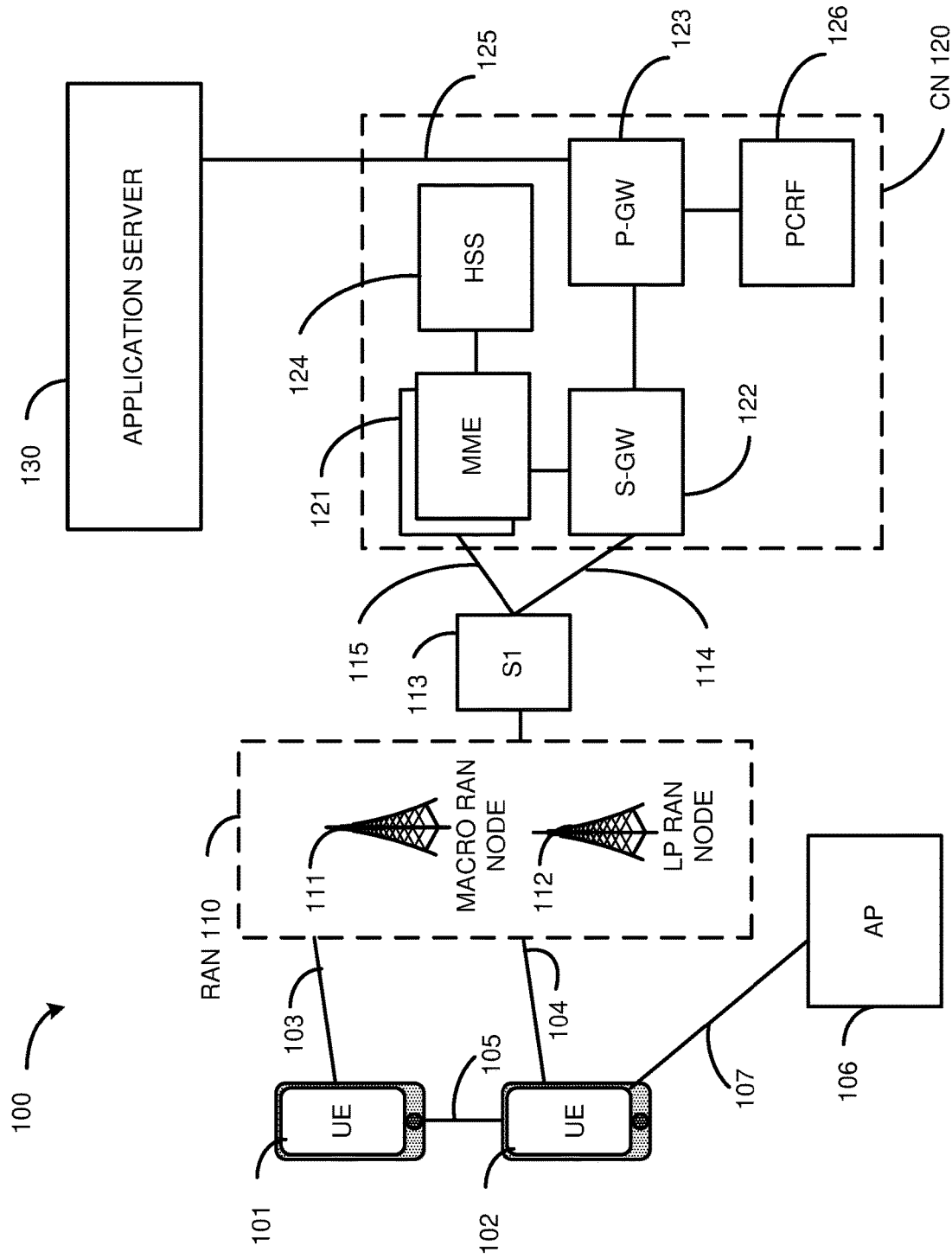
FIG. 1 depicts an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (E-UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
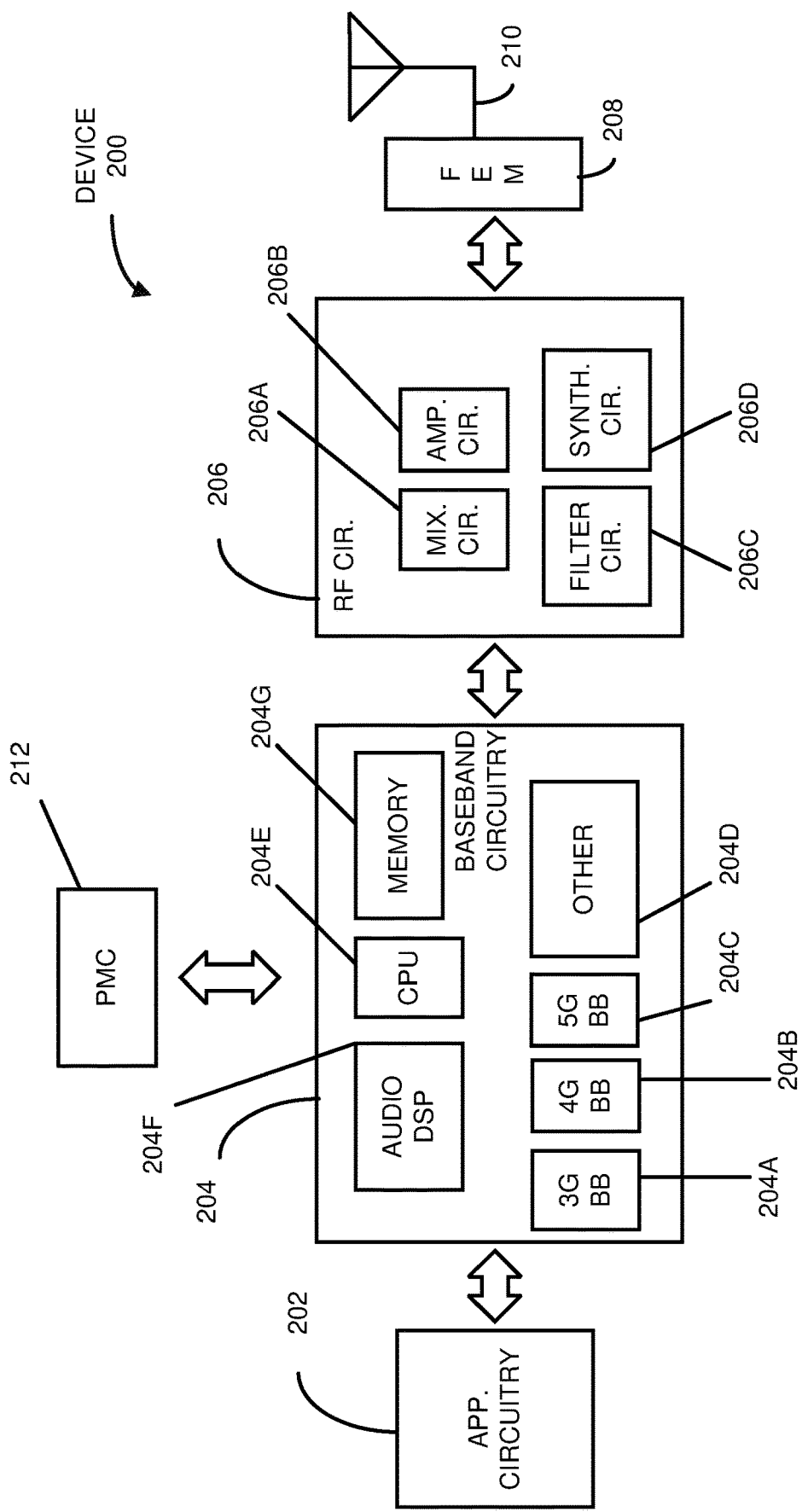
FIG. 2 depicts example components of a device in accordance with some embodiments

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuity 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state. To receive data, a transition back to RRC_Connected state will be implemented.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
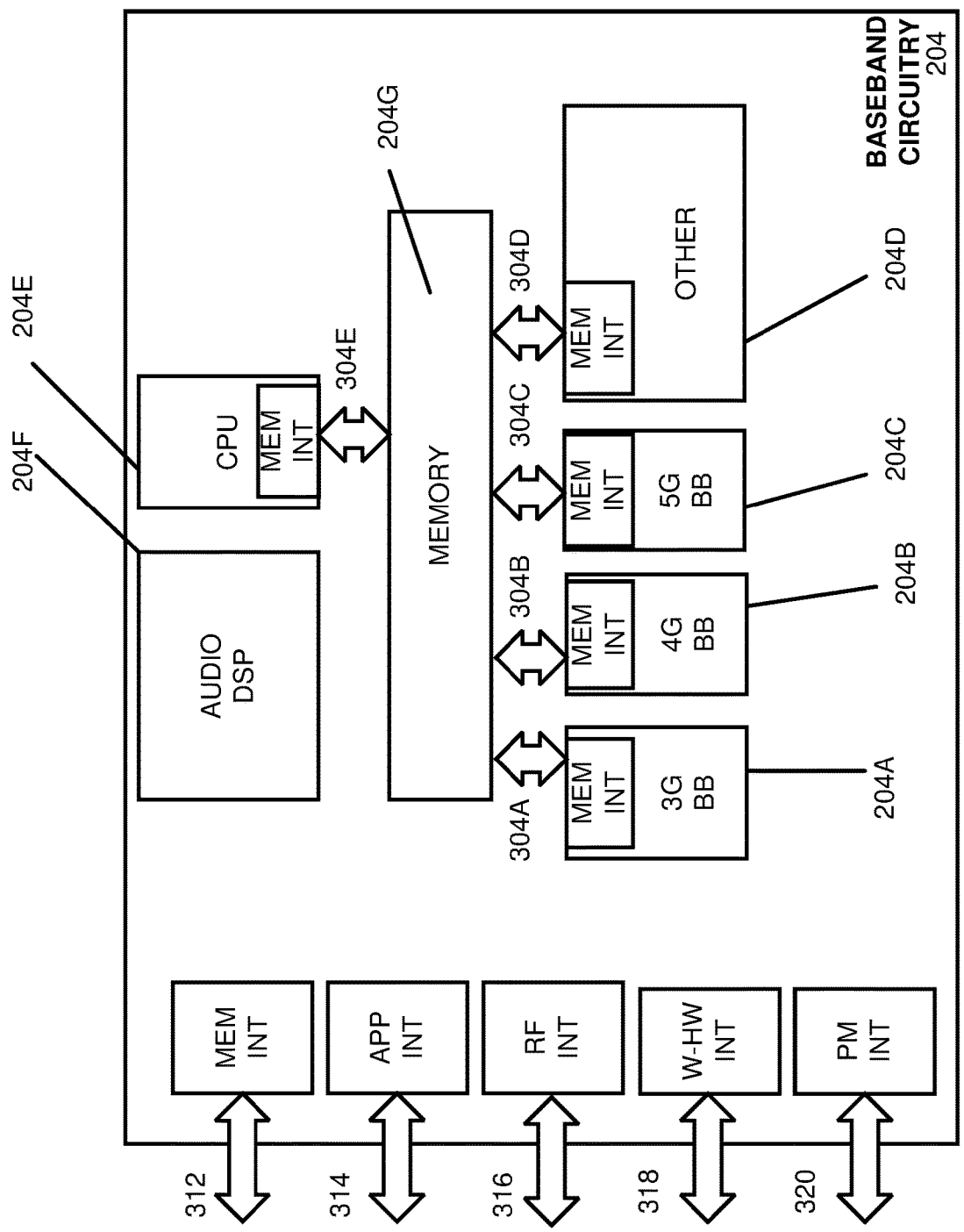
FIG. 3 depicts example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
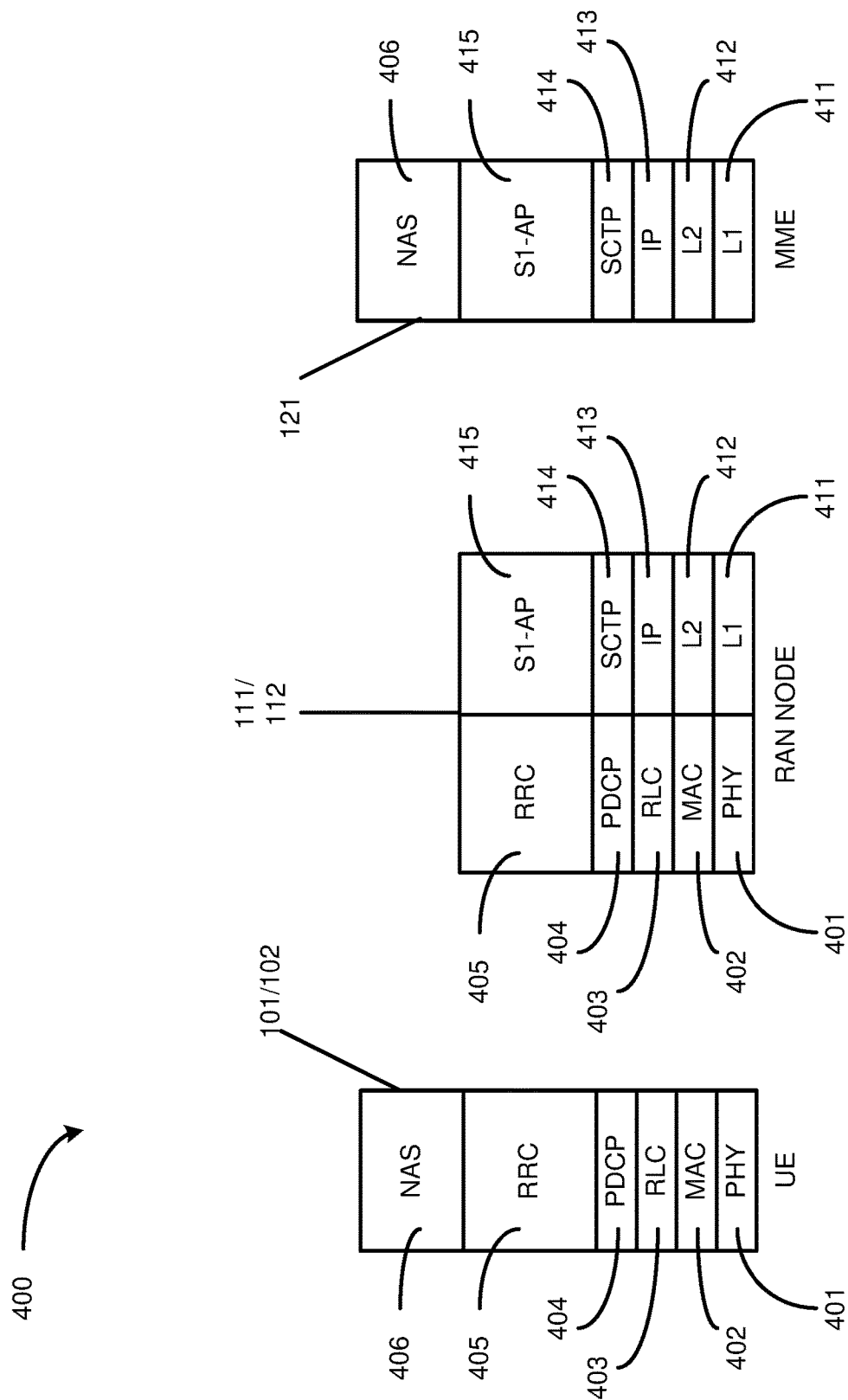
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
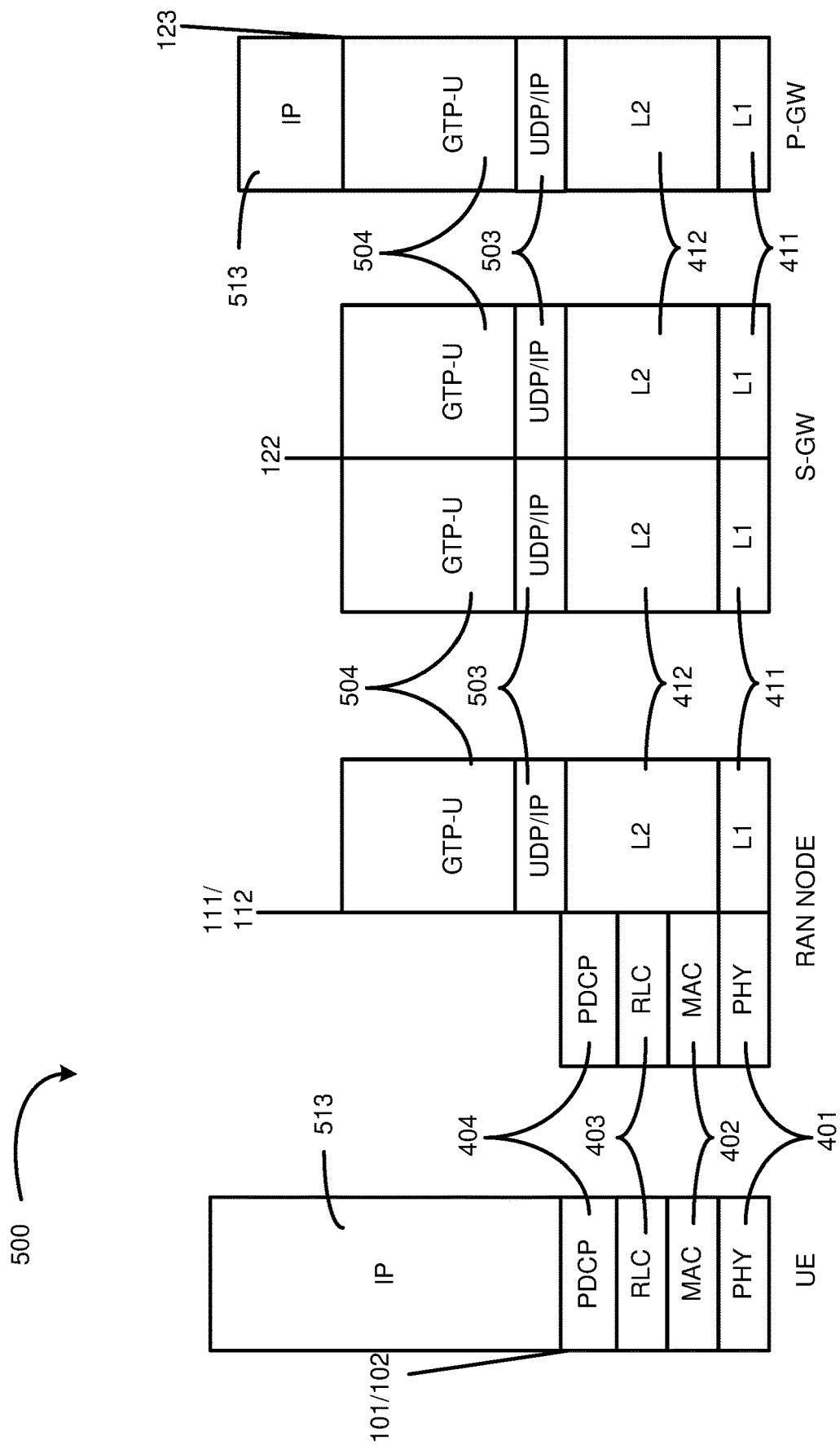
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
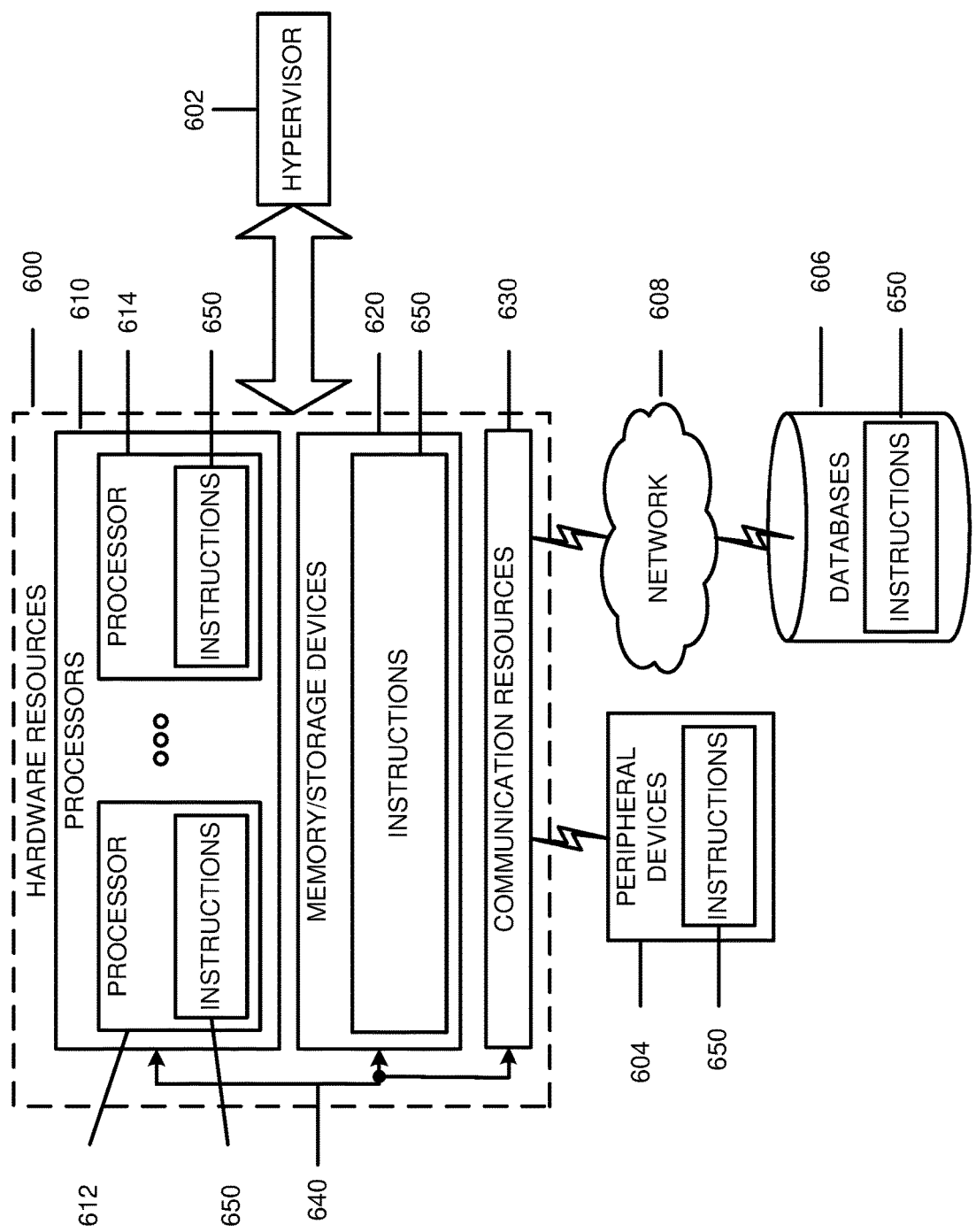
FIG. 6 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 6 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 800 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
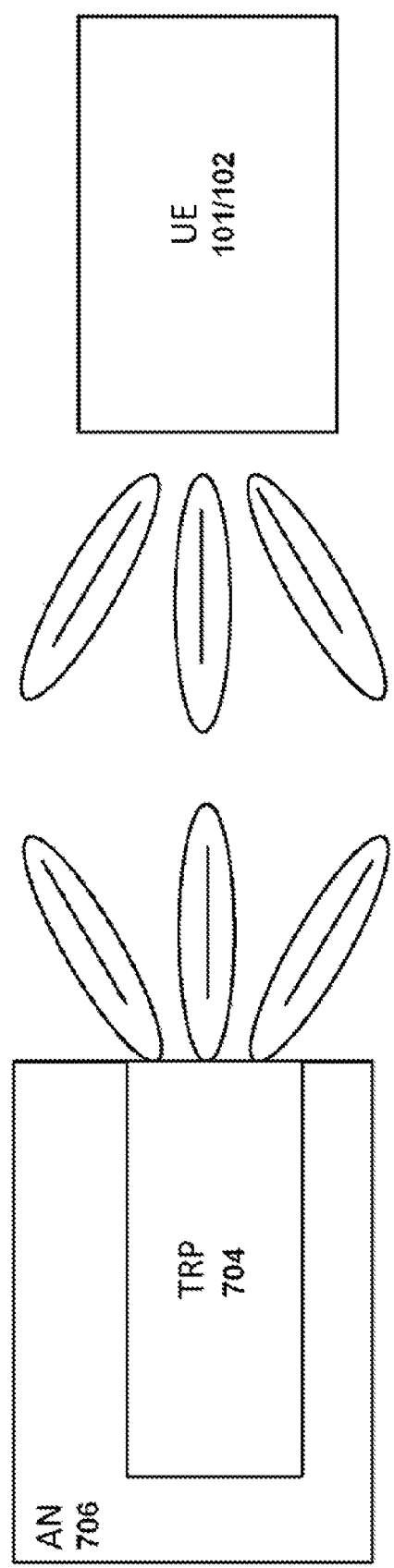
FIG. 7 illustrates wireless communication between a transmission/reception point ("TRP") and a user equipment ("UE") in accordance with various embodiments.

FIG. 7 illustrates wireless communication between a transmission/reception point ("TRP") 704 and a user equipment ("UE") 101/102 in accordance with various embodiments. The TRP 704 may be part of, or controlled by, an access node ("AN") 706 of a radio access network ("RAN"). The access node 706 may be referred to as a base station ("BS"), NodeB, evolved NodeB ("eNB"), next Generation NodeB ("gNB"), RAN node, Road Side Unit ("RSU"), and so forth, and may comprise a ground station (e.g., a terrestrial access point) or a satellite station providing coverage within a geographic area (e.g., a cell). An RSU may refer to any transportation infrastructure entity implemented in or by a gNB/eNB/RAN node or a stationary (or relatively stationary) UE, where an RSU implemented in or by a UE may be referred to as a "UE-type RSU," and an RSU implemented in or by an eNB may be referred to as an "eNB-type RSU".

In some embodiments, the RAN may be a next generation ("NG") radio access network ("RAN"), in which case the TRP may be part of, or controlled by, a gNB that communicates with the UE using a new radio ("NR") access technology.

In the 5G new radio (NR) system, beam forming will be used at both the Transmission Reception Point (TRP) side and the user equipment (UE) side. Beam management is used to acquire and maintain TRP and UE beams for communication. A beam management procedure may be performed to determine an appropriate Transmit (Tx) beam to be employed by the TRP 704 and Receiver (Rx) beam employed by the UE 101/102. For downlink, the beam management procedures may include P-1, P-2 and P-3. P-1 is to obtain the initial TRP Transmit (Tx) beam and UE Receiver (Rx) beam. P-2 is to enable the TRP Tx beam refinement. For example, one UE Receiver (Rx) beam is fixed while several TRP Tx beams are measured, and the TRP Tx beam with best quality is selected. P-3 is to enable the UE Rx beam refinement. For example, one TRP Tx beam is fixed while several UE Rx beam are measured, and the UE Rx beam with best quality is selected. The selected TRP Tx beam and UE Rx beam are then used for communication. The reference signal for beam management may be a Channel State Information-Reference signal (CSI-RS) or a synchronization signal (SS) Block.

During P-1, P-2 and P-3 procedures, TRP sends the UE a specific reference signal and the UE use the reference signal to measure the radio link quality. After measurement, the UE may report to the TRP which Tx beams are better for communications, and the reported content may include the Tx beam index or beam pair link (BPL) index and the Reference Signal Received Power (RSRP). Considering the large number of beams, the overhead for reporting beam state may be high. In order to reduce this overhead, group based beam reporting has been proposed. The UE may report several, e.g. two, Tx beams which can be received simultaneously.

In order to reduce overhead, the UE may indicate the relationship between two reporting instances, i.e. whether the Tx beams at the two reporting instances can be received simultaneously. In this way, more than two Tx beams may be reported.

In order to enable group based beam reporting, the TRP may provide information about which Tx beams can be transmitted simultaneously. This information may assist the UE in determining which Tx beams can be received simultaneously.

For non-group based beam reporting, the TRP may also provide information for Tx beam grouping. The TRP also configures the UE with CSI-RS or synchronization signal (SS) Block as a reference signal. Generally speaking, a wide beam will be deployed for SS Block and a narrow beam is applied for CSI-RS. And SS Block beams are Quasi-Co-Located (QCL) with CSI-RS beams. Since the CSI-RS beams are narrow, the reported CSI-RS beams may face the same direction, and, if blockage occurs, several reported CSI-RS beams may fail at the same time. Thus for greater robustness, the UE may report several CSI-RS beams that are Quasi-Co-Located with different SS Block beams.

For uplink, beam management procedures U-1, U-2, and U-3, which are similar to P-1, P-2 and P-3, may be included. U-1 is to obtain the initial UE Transmit (Tx) beam and TRP Receiver (Rx) beam. U-2 is to enable the TRP Rx beam refinement. U-3 is to enable the UE Tx beam refinement. In these procedures, beam grouping may also be applied. The UE may report the grouping information, i.e. which Tx beams are from the same group (antenna panel). The TRP could create UE Tx beams combination (Tx beam set), and signal the mapping of Tx beam set ID with the UE Tx beams, and the UE Tx beam set ID could be used for the purpose of uplink (UL) beam indication.

Hereinafter, TRP is described as a next Generation NodeB ("gNB").

Embodiments herein may disclose methods for beam grouping in NR. The relationship between two reporting instances may be indicated, i.e. whether the Tx beams at two reporting instances can be received simultaneously. The gNB may provide information which Tx beams can be transmitted simultaneously. The gNB may configure CSI-RS or SS Block as reference signal for beam management. The SS Block beam may be viewed as a group of associated CSI-RS beams. For uplink, the UE may report UE Tx beam group information, and the gNB may signal to the UE the mapping of Tx beam set with the UE Tx beams.

<Downlink: Group Based Beam Reporting at Different Reporting Instances>

Beam reporting is important for beam management. The UE may use the reference signal, configured by the gNB, to measure the quality of the radio link. Based on this report, the gNB will have the up-to-date information on beam quality. However, due to the large number of beams, the overhead for beam state reporting may be high. Thus, to reduce the overhead, embodiments herein may include group based beam reporting. A UE may report two Tx beams that can be received simultaneously by the UE.

Assuming the number of reported Tx beams is two, the UE may report Tx beams in different reporting instances if the UE reports more than two Tx beams. The UE may use a one-bit indicator to indicate the relationship of the Tx beams between two reporting instances, for example, whether the Tx beams reported at different reporting instances can be received simultaneously or not. The one-bit indicator may be transmitted together with the first report or the second report.

For example, a UE has two panels and each panel has dual polarization. Thus in a first reporting instance, the UE may report two Tx beams observed by the same panel with different polarizations. And in the next reporting instance, the UE may report two Tx beams observed by another panel. In this case, the UE may use one bit to indicate that the reported Tx beams in the different reporting instances can be received by the UE simultaneously.

In another example, the UE reports four Tx beams, two Tx beams from each panel. The UE may first report two Tx beams, one Tx beam from each panel. And in the next reporting instance, the UE reports the two remaining Tx beams. In this case, the UE may use one bit to indicate the Tx beams reported in different reporting instances can not be received simultaneously by the UE. And in the report, the order in which the Tx beams are reported may implicitly carry information. For example, if the first Tx beam is from the first panel, and second Tx beam is from the second panel, the gNB will recognize which Tx beams are observed by the same UE antenna panel and can be received by the UE simultaneously.

In a third example, the UE reports two Tx beams observed by the same panel in the first reporting instance, and the UE reports another two Tx beams observed by the other panel in the next reporting instance. In this case, the UE may use one bit to indicate the Tx beams reported across different reporting instances can be received simultaneously by the UE.

Alternatively, the gNB could configure whether the reported Tx beams may be considered across different reporting instances. The gNB could trigger the UE to report Tx beams from one panel and to report Tx beams from the other panel in the next reporting instance. Or the UE may report two Tx beams, one from each panel at one reporting instance.

In some embodiments, the UE may use one bit to indicate whether the Tx beams reported at different reporting instances can be received simultaneously. Alternatively, the gNB may provide the UE with a one-bit indicator for use in reporting whether Tx beams can be received simultaneously or not across different reporting instances.

<Downlink: gNB Tx Beam Grouping>

Figure 8:
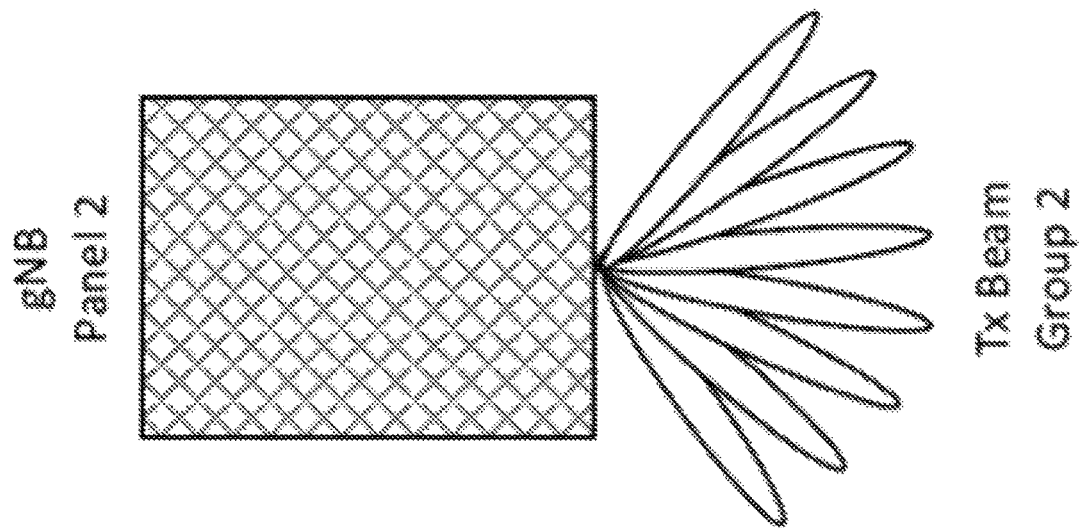
FIG. 8 depicts an example of a next generation node (gNB) transmitter beam group, in accordance with some embodiments.
Figure 8:
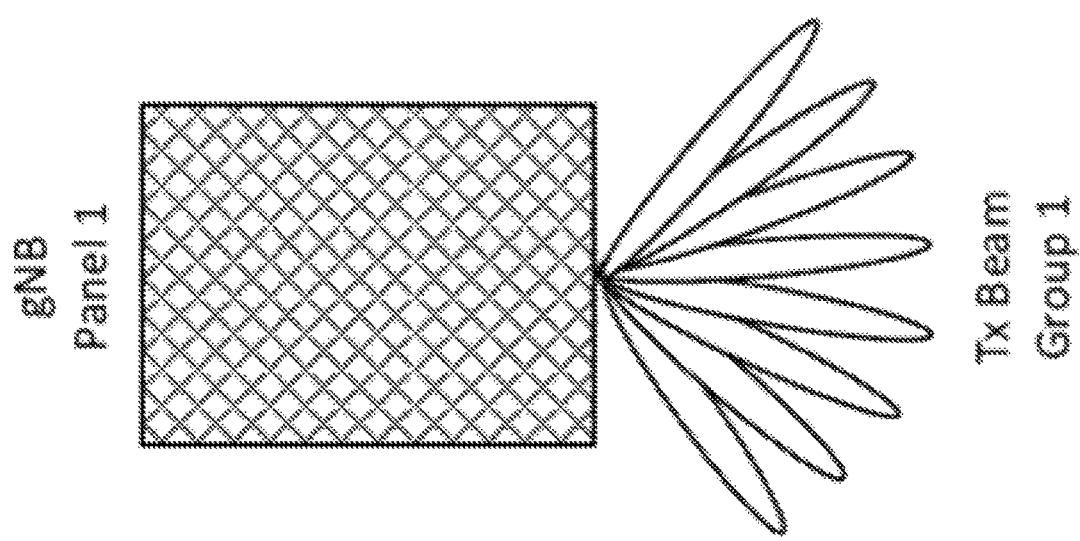

For group based beam reporting, the UE reports Tx beams that can be received simultaneously. However, it is the gNB that determines whether the Tx beams can be transmitted simultaneously. For example, since two Tx beams cannot be sent from a particular gNB antenna panel at the same time, beam grouping occurs on the gNB side. FIG. 8 shows an example. In FIG. 8, the Tx beams transmitted from gNB panel 1 form Tx beam Group 1 and the Tx beams transmitted from gNB panel 2 form Tx beam Group 2. The gNB cannot transmit the Tx beams in Group 1 simultaneously nor can it transmit the Tx beams in Group 2 transmitted simultaneously. On the other hand, the gNB can transmit a Tx beam in Group 1 and a Tx beam in Group 2 simultaneously.

Thus the gNB may provide information on which Tx beams can be transmitted simultaneously, i.e. the gNB provides the UE with Tx beam grouping information so that the UE may select proper Tx beams to report.

For example, a tag may be added to each Tx beam, and those Tx beams with the same tag form one group. And the gNB cannot transmit the Tx beams in the same group simultaneously, but it can transmit Tx beams across different groups simultaneously. The tag may be based on the gNB antenna panel or antenna port.

Alternatively, the gNB Tx beam grouping may be based on CSI-RS resource set, i.e. each CSI-RS resource set is a group of gNB Tx beams. And while the gNB Tx beams within each set cannot be transmitted simultaneously, Tx beams across different sets can be sent at the same time.

In one embodiment, the gNB may deliver downlink Tx beam grouping information to the UE by adding a tag to the Tx beam. The gNB does not transmit Tx beams with the same group tag simultaneously but may transmit the Tx beams with different group tags simultaneously. Alternatively, the gNB may base Tx beam grouping on a CSI-RS resource set, i.e. each CSI-RS resource set is group of Tx beams. For example, when configuring the CSI-RS resource set, the gNB may add one group index to each set. In still another option, the determination as to whether the CSI-RS Resources in different resource sets can be transmitted simultaneously or not may be predefined.

<Downlink: Non-Group Based Beam Reporting>

For non-group based beam reporting, the UE reports several Tx beams with higher radio link quality. The measurement of the radio link quality is based on CSI-RS beam or SS Block beam. However, since the CSI-RS beam is narrow, the Tx beams with higher radio link quality may be close to each other. Thus if blockage occurs, all the reported Tx beams may fail.

Figure 9:
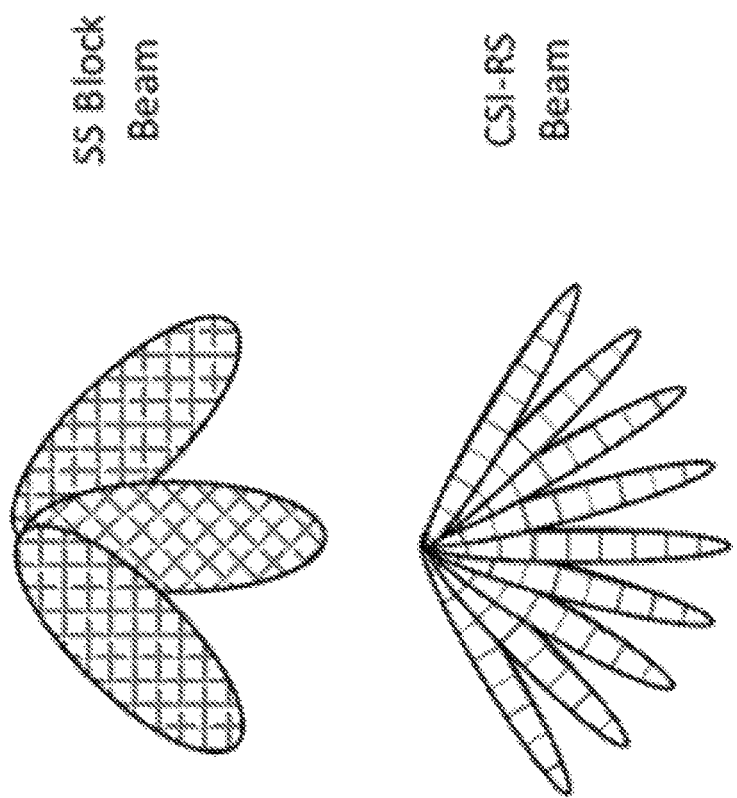
FIG. 9 depicts an example of a synchronization signal (SS) Block beam and Channel State Information-Reference signal (CSI-RS) beam, in accordance with some embodiments.

In one embodiment, the SS Block may be used for beam management with L1-RSRP reporting. Since SS Block generally utilizes a wide beam and SS Block is Quasi Co-Located with CSI-RS beams, the SS Block beam may be considered to be an implicit grouping of CSI-RS beams. FIG. 9 shows an example of the SS block beam and CSI-RS beams. In FIG. 9, the left three CSI-RS beams are associated with the left SS Block beam, and the middle three CSI-RS beams are associated with the middle SS Block beam, and the right three CSI-RS beams are associated with the right SS Block beam.

Thus when the UE reports Tx beams, it may report CSI-RS beams associated with different SS Block beams. Thus the CSI-RS beams may point in several diverse directions, thereby making the system more robust.

In another embodiment, when the UE reports Tx beams via CSI-RS, the UE may consider SS Block beams. The reported CSI-RS may have good quality, i.e. the corresponding L1-RSRP may be higher than a certain threshold. Furthermore, the reported CSI-RS beams may be associated (Quasi Co-Located) with different SS Block beams (at least two SS Block beams, if the CSI-RS beam quality being reported are good enough). Thus, the reported CSI-RS beams will point in significantly different directions. Whether the reporting takes SS Block beam into account may be configured (turned on/off) by the gNB.

In yet another embodiment, whether non-group based reporting at time instance k and at time instance k−1 are to be simultaneously reported or not can be pre-defined or configured by higher layer signaling or downlink control information (DCI) or reported by the UE with an explicit indicator. For example, an indicator can be added in the DCI that is used to trigger beam reporting, where the value 0 may indicate it is not necessary for reporting to include the beams that can be simultaneously received by the UE, and the value 1 may indicate that all the reporting beams in this time instance and the beams in the prior time instance can be received simultaneously by the UE.

<Uplink: UE Tx Beam Grouping and Beam Indication>

For uplink transmission, the UE may transmit multiple UE Tx beams simultaneously for spatial multiplexing or diversity. However, in the uplink, which UE Tx beam(s) are to be used depends on the indication from the gNB.

For uplink, beam management procedures U-1, U-2 and U-3 may be included. Signaling exchange may be used to perform beam management procedures. The signaling can include control signaling for the procedure and the decision after receiving the uplink beam management reference signal, e.g. a sounding reference signal (SRS).

During U-1 procedures, the gNB may acquire initial uplink (UL) Tx/Rx beam pair information. The initial UL Tx/Rx beam pair information may include information to identify a uplink (UL) Tx beam and a UL Rx beam. Then the gNB may transmit to the UE downlink control information (DCI) including an indication that indicates a UL beam index. The DCI may be used to trigger transmission of a sounding reference signal (SRS) from the UE. The indication may be, for example, an SRS resource indicator (SRI) or any other type of indicator that may serve as a basis for the election of a particular UL beam by the UE.

During U-2 procedures, the UE may use one Tx beam for some repetitions and the next generation NodeB (gNB) may perform Rx beam sweeping. The UE may generate and send one or more instances of an SRS based on the UL beam index. The gNB may refine the UL Rx beam based on the received SRS.

During U-3 procedures, the gNB may use one Rx beam to receive multiple repetitions with different Tx beams. Then control signaling may indicate the particular link to the UE so that the UE can update the corresponding reference signal received power (RSRP) measurement. The gNB may refine the UL Tx beam based on the updated RSRP.

When the UE reports to the gNB during the above mentioned procedures, the UE may add a tag to each Tx beam during UE Tx beam sweeping to indicate the group to which the Tx beam belongs. The group tag information may be based on the UE antenna panel or antenna port. While the UE cannot transmit the Tx beams within the same group simultaneously, the Tx beams in different groups may be transmitted simultaneously. After gNB performs a refinement procedure, the gNB may select the proper UE Tx beam(s) for simultaneous transmission. The uplink beam indication may be based on SRS resource indicator (SRI). The UE may use one or multiple SRS resources for SRS transmission, where the number of SRS resources which can be configured to the UE for simultaneously transmission in the same RBs is a UE capability.

In one embodiment, the UE may report UE Tx beams together with group information. The group could be based on a UE antenna panel or antenna port. While the UE may not be transmit the Tx beams within the same group simultaneously, the Tx beams across different groups may be transmitted simultaneously. After gNB performs refinement procedure, the gNB could select proper UE Tx beam(s) for simultaneous transmission.

Alternatively, the UE can transmit Tx beams without group information. After refinement, the gNB sends the UE information about which Tx beams have good quality. The UE then split the Tx beams into different groups. Within one group, the Tx beams are from different UE antenna panels. Thus the UE Tx beams within one group may be transmitted simultaneously. Correspondingly, the UE Tx beams in different groups cannot be transmitted simultaneously. The UE may report the grouping information back to the gNB including the group ID corresponding to UE Tx beams. The gNB may use the group ID to indicate which UE Tx beams may be used.

For a non-group based operation, the uplink beam indication can be based on the SRS resource indicator (SRI), e.g. the gNB send the SRI to the UE and the UE selects the corresponding Tx beam. Alternatively, explicit signaling may be used to reduce overhead. After beam sweeping, the gNB select several UE Tx beams with good quality and each Tx beam is mapped to one indicator or index. The gNB may then signal the mapping explicitly to the UE and use the indicator or index for beam indication purpose with reduced overhead.

<CSI-RS Configuration>

When configuring channel state information (CSI)-reference signal (RS) beams, the next generation NodeB (gNB) may also indicate the Energy Per Resource Element (EPRE) for the CSI-RS resource. The EPRE may be on the CSI-RS resource set basis or on the CSI-RS resource basis. When the UE calculates layer 1 (L1)-Reference Signal Received Power (RSRP), the corresponding EPRE may be taken into account.

If the CSI-RS for beam management is configured with only one port, two CSI-RS resources may be quasi co-located to achieve functioning similar to two port CSI-RS.

Figure 10:
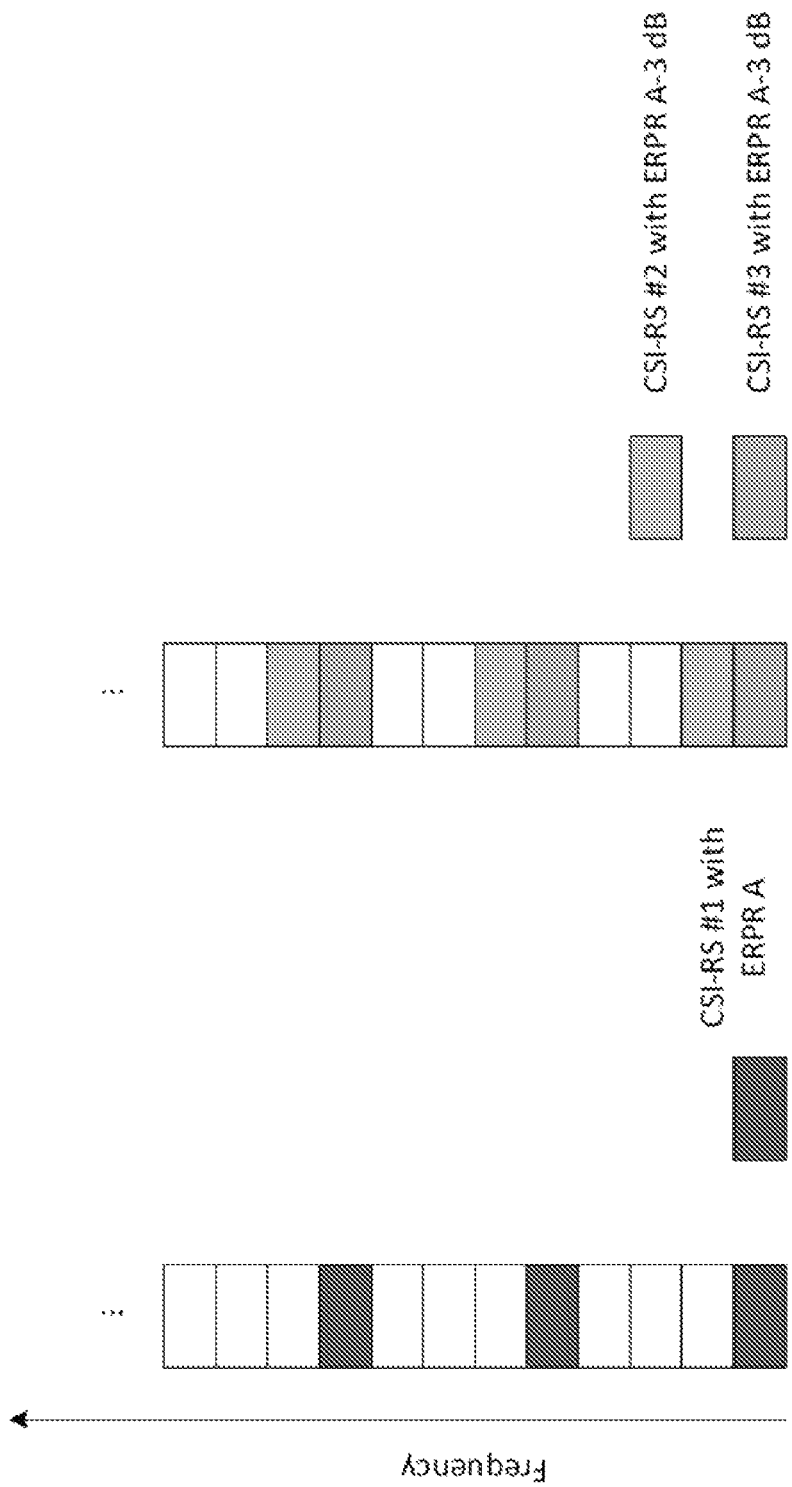
FIG. 10 depicts an example of energy per resource element (EPRE) setting for channel state information (CSI)-reference signal (RS) in accordance with some embodiments.

When configuring the CSI-RS beams, the gNB may also indicate the EPRE (Energy per Resource Element) for the CSI-RS resource. For example, multiplexing two CSI-RS in the same OFDM symbol may result in an EPRE for the two CSI-RS that is 3$d$B lower than in the case with only one CSI-RS in the OFDM symbol. FIG. 10 shows an example of the EPRE configuration. The left side of FIG. 10 illustrates the situation in which only one CSI-RS is included within one OFDM symbol. The right side of the figure illustrates the situation in which two CSI-RSs are included within one OFDM symbol. Thus the EPRE for the situation on the right is lower than that on the left. In addition, the EPRE configuration may also be applied to the synchronization signal (SS) Block.

The UE may take the EPRE into consideration when it calculates L1-RSRP for beam reporting because the L1-RSRP results need to be scaled based on the EPRE. In FIG. 10, if L1-RSRP is not scaled based on the EPRE, the L1-RSRP results in the right situation might be lower because of the multiplex of CSI-RS, thus the L1-RSRP results will not reflect actual radio link quality. The beam reporting may reflect more accurate radio link quality if a different EPRE is configured for different CSI-RS or SS Block beams.

In embodiments, the gNB may configure the EPRE for the CSI-RS beam. The EPRE may be configured for each CSI-RS resource. Alternatively, the EPRE may be configured on a CSI-RS resource set basis, e.g., the CSI-RS in the same resource set is configured with the same EPRE setting. The different EPRE settings may also be applied to different SS Block beams and the gNB may indicate the EPRE setting for the SS block to the UE.

In embodiments, when the UE calculates the L1-RSRP for beam reporting, the EPRE setting may be taken into account. The L1-RSRP measurement results need to be scaled according to the different EPRE setting in order to reflect actual radio link quality of the different CSI-RS beams. In its beam report, the UE may identify those beams with smallest pathloss or those beams with highest RSRP with a baseline EPRE as "Top beams". Similarly when the UE calculates the L1-RSRP for an SS block, the L1-RSRP may be scaled according to the EPRE setting for a different SS block.

In embodiments, if a joint CSI-RS and SS block is used, the UE may calculate the L1-RSRP based on the CSI-RS portion only or on the SS block portion only or on the SS Block and the CSI-RS averaged across the entire band. The EPRE setting also needs to be considered in the L1-RSRP calculation. In one report, the reported gNB transmission (Tx) beams may all be CSI-RS beams, all SS block beams, or all joint CSI-RS and SS block beams.

For example, for a CSI-RS resource or a CSI-RS resource set, an indicator of the EPRE boosting ratio can be included. Then the L1-RSRP in the beam report may always be based on the case where the EPRE boosting rate=0 dB. This arrangement allows the L1-RSRP to be calculated by measured by the RSRP−EPRE boosting ratio.

For CSI-RS for beam management, if the CSI-RS is configured with just one port, two CSI-RS resource could be quasi co-located in order to achieve functioning similar to two port CSI-RS.

In embodiments, for a CSI-RS configuration with one port, two CSI-RS may be quasi co-located in order to achieve functioning similar to two port CSI-RS. Then each port may represent each polarization of a beam. When reporting the beam state, the UE may report one of the quasi co-located CSI-RS resources based on the minimal or maximum or average RSRP from both CSI-RS resources. In one example, if a UE is configured with 8 CSI-RS resources, and every 2 CSI-RS resources are quasi co-located, the UE could report the beam based on 4 beams in 8 CSI-RS resources.

The quasi co-location among multiple CSI-RS resources may be configured by higher layer signaling or DCI and/or determined by the CSI-RS resource index. For example, the higher layer may configure the number of CSI-RS resources per beam N, then every N CSI-RS resources may be considered to be quasi co-located.

The quasi co-located CSI-RS resources may always be multiplexed in a Frequency Division Multiplexing (FDM) manner so that the UE is able measure one beam at one time.

In some embodiments, the electronic device(s), network(s), system(s), chip(s) or component(s), or portions or implementations thereof, of any figure herein may be configured to perform one or more processes, techniques, or methods as described herein, or portions thereof.

In embodiments where the electronic device(s), or one or more portions, implementations, or components thereof, of one or more of FIGS. 1, 2, 3, and/or FIG. 6 is, implements, is incorporated into, or is otherwise part of a UE, various circuitries may be utilized to split transmission beams into different groups; report information on the quality of transmission beams to the next generation node (gNB); and indicate the relationship between two reporting instances.

In embodiments where the electronic device(s), or one or more portions, implementations, or components thereof, of one or more of FIGS. 1, 2, 3, and/or FIG. 6 is, implements, is incorporated into, or is otherwise part of a TRP or a gNB, various circuitries may be utilized to indicate to a user equipment (UE) a transmission beam to be used by the UE; deliver downlink transmission beams grouping information to the UE; and perform a refinement procedure.

Figure 11:
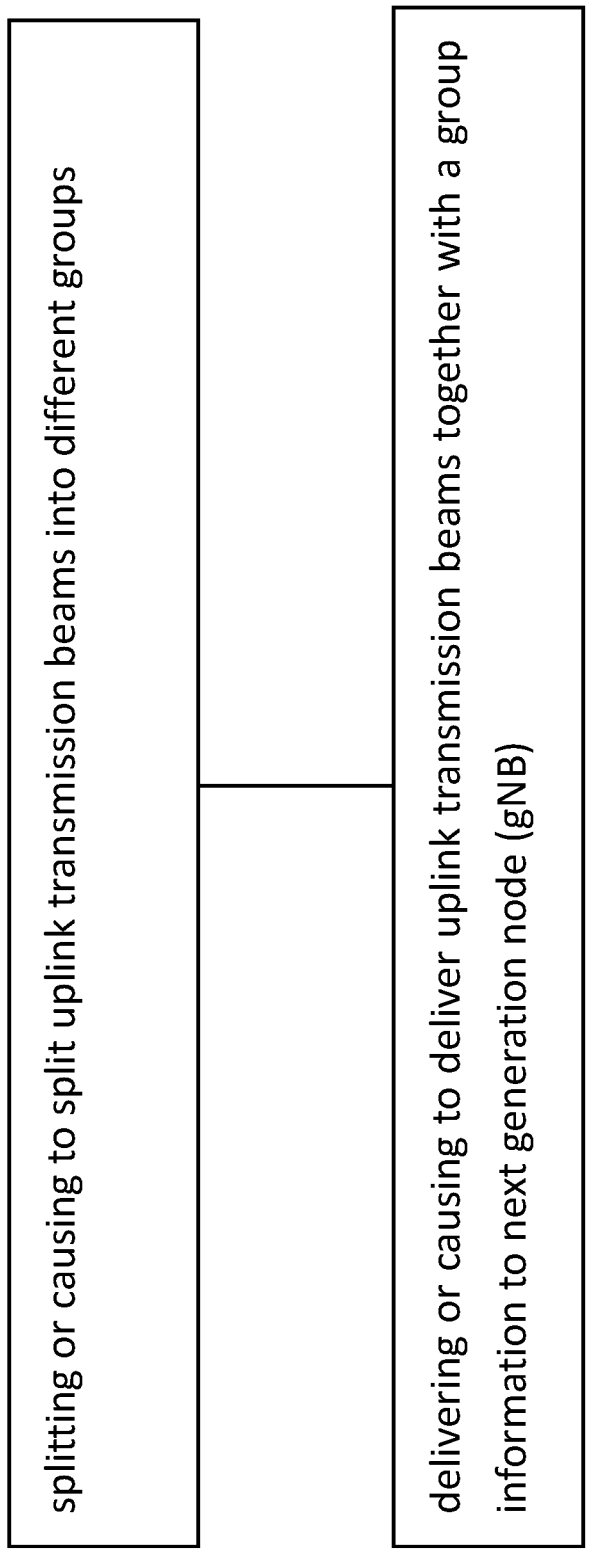
FIG. 11 depicts a process performed by the electronic device of FIGS. 1, 2, 3, and/or FIG. 6.

In some embodiments, the electronic device of FIGS. 1, 2, 3, and/or FIG. 6 may be configured to perform one or more processes, techniques, and/or mechanisms as described herein, or portions thereof. One such process is depicted in FIG. 11. For example, the process may include: splitting or causing to split uplink transmission beams into different groups; and delivering or causing to deliver uplink transmission beams together with a group information to next generation node (gNB).

In some embodiments, the electronic device of FIGS. 1, 2, 3, and/or FIG. 6 may be configured to perform one or more processes, techniques, and/or mechanisms as described herein, or portions thereof. One such process is depicted in FIG. 12. For example, the process may include: splitting or causing to split downlink transmission beams into different groups; reporting or causing to report information on quality of downlink transmission beams to next generation node (gNB); and indicating or causing to indicate relationship between two reporting instances.

In some embodiments, the electronic device of FIGS. 1, 2, 3, and/or FIG. 6 may be configured to perform one or more processes, techniques, and/or methods as described herein, or portions thereof. One such process is depicted in FIG. 13. For example, the process may include: indicating or causing to indicate to a user equipment (UE) a downlink transmission beam to be used by the UE; delivering or causing to deliver downlink transmission beams grouping information to the UE; and performing or causing to perform refinement procedure.

EXAMPLES

Example 1 is an apparatus for a User Equipment (UE), comprising: a radio frequency (RF) interface; and a processor configured to: split uplink transmission beams into different groups; generate uplink transmission beams together with group information for a transmit signal path; and send the generated uplink transmission beams to the RF interface.

In Example 2, the subject matter of Example 1 or any of the Examples described herein may further include wherein the group information is based on a UE antenna panel or an antenna port for simultaneous transmission.

In Example 3, the subject matter of Example 1 or any of the Examples described herein may further include wherein, for a non-group based operation, the processor selects the uplink transmission beams based on a sounding reference signal Resource Indicator (SRI).

In Example 4, the subject matter of Example 1 or any of the Examples described herein may further include wherein, for a non-group based operation, the processor selects the uplink transmission beams based on an indicator or an index.

Example 5 is an apparatus for a User Equipment (UE), comprising: a radio frequency (RF) interface; and a processor configured to: split downlink transmission beams into different groups; generate report information on quality of the downlink transmission beams for a transmit signal path; and indicate a relationship between two reporting instances.

In Example 6, the subject matter of Example 5 or any of the Examples described herein may further include wherein the relationship between the two reporting instances is whether the downlink transmission beams reported at different reporting instances can be received simultaneously by the UE.

In Example 7, the subject matter of Example 5 or any of the Examples described herein may further include wherein the quality of the downlink transmission beams is reported by a Channel State Information-Reference signal (CSI-RS) or a synchronization signal (SS) Block.

In Example 8, the subject matter of Example 5 or any of the Examples described herein may further include wherein group information is reported together with downlink transmission beam quality.

In Example 9, the subject matter of Example 5 or any of the Examples described herein may further include wherein the downlink transmission beams within one group are from different UE antenna panels.

In Example 10, the subject matter of Example 5 or any of the Examples described herein may further include wherein a one-bit indicator is used to indicate whether the downlink transmission beams reported at different reporting instances can be received simultaneously by the UE.

In Example 11, the subject matter of Example 5 or any of the Examples described herein may further include wherein, for non-group based reporting, the quality of transmission beams are reported by Channel State Information-Reference signal (CSI-RS) associated with different synchronization signal (SS) Block beams.

In Example 12, the subject matter of Example 5 or any of the Examples described herein may further include wherein, for non-group based reporting, the relationship between two reporting instances is pre-defined or configured by higher layer signaling or downlink control information (DCI) or reported by the UE with an explicit indicator.

Example 13 is an apparatus for a gNB (next Generation Node B), comprising: a memory interface; and a processor configured to: indicate to a user equipment (UE) a downlink transmission beam to be used by the UE; deliver downlink transmission beam grouping information to the UE; and perform a beam refinement procedure.

In Example 14, the subject matter of Example 13 or any of the Examples described herein may further include wherein proper downlink transmission beams are selected for simultaneous transmission.

In Example 15, the subject matter of Example 13 or any of the Examples described herein may further include wherein the processor is to further generate configuration data for the UE with a one-bit indicator to indicate whether the UE is to report the transmission beams.

In Example 16, the subject matter of Example 13 or any of the Examples described herein may further include wherein the downlink transmission beam grouping information is based on a Channel State Information-Reference signal (CSI-RS) resource set.

In Example 17, the subject matter of Example 13 or any of the Examples described herein may further include wherein a group tag is added to the downlink transmission beams, wherein the gNB transmit simultaneously only transmission beams having different group tags.

Example 18 is an apparatus for a next Generation Node B (gNB), comprising: a memory interface; and a processor configured to generate configuration data for a User Equipment (UE) with one or both of Channel State Information-Reference signal (CSI-RS) and synchronization signal (SS) Block for beam management, wherein Energy per Resource Element (EPRE) information is included when configuring the CSI-RS or the SS Block.

In Example 19, the subject matter of Example 18 or any of the Examples described herein may further include wherein the ERPE information is configured for each of the CSI-RS.

In Example 20, the subject matter of Example 18 or any of the Examples described herein may further include wherein the EPRE information is configured on CSI-RS resource set basis and the CSI-RS within the same set is configured with the same EPRE.

In Example 21, the subject matter of Example 18 or any of the Examples described herein may further include wherein a different EPRE setting is applied to different SS Block beams and the gNB indicates the EPRE setting for SS Block to the UE.

Example 22 is an apparatus for a User Equipment (UE), comprising: a radio frequency (RF) interface; and a processor configured to generate information on quality of the downlink transmission beams for a transmit signal path, wherein the UE measures one or both of Channel State Information-Reference signal (CSI-RS) beams and synchronization signal (SS) Block beams and calculates L1-Reference Signal Received Power (L1-RSRP) for beam reporting, and the L1-RSRP is scaled based on Energy per Resource Element (EPRE) information.

In Example 23, the subject matter of Example 22 or any of the Examples described herein may further include wherein if a joint CSI-RS and SS block is used, the UE calculates the L1-RSRP based on the CSI-RS part, or based on the SS block part, or based on the SS Block and the CSI-RS.

In Example 24, the subject matter of Example 22 or any of the Examples described herein may further include wherein for a CSI-RS configuration with one port, two CSI-RSs are quasi co-located.

In Example 25, the subject matter of Example 24 or any of the Examples described herein may further include wherein the UE reports one of the quasi co-located CSI-RS resources based on the minimal or maximum or average RSRP from both CSI-RS resources.

In Example 26, the subject matter of Example 24 or any of the Examples described herein may further include wherein the quasi co-location (QCL) between two CSI-RS resources is configured by higher layer signaling or downlink control information (DCI) or determined by the CSI-RS resource index.

In Example 27, the subject matter of Example 24 or any of the Examples described herein may further include wherein the quasi co-located CSI-RS resource is mapped in Frequency Division Multiplexing (FDM) manner.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus, comprising:
a radio frequency (RF) interface; and
a processor in communication with the RF interface, wherein the processor is configured to:
receive, from a base station, an indication whether group-based beam reporting is indicated, wherein group-based beam reporting includes reporting multiple downlink beams that can be received simultaneously, wherein respective beams of the multiple downlink beams are associated with synchronization signal blocks (SSBs); and
generate report information for downlink transmission beams according to the indication, wherein, when group-based beam reporting is indicated, the report information includes indices and layer 1 reference signal received power (L1-RSRP) information for the multiple downlink beams that can be received simultaneously, and wherein, for non-group based reporting, the report information includes L1-RSRP information of a plurality of downlink transmission beams for channel state information-reference signals (CSI-RSs) quasi-collocated with different SSB beams.

2. The apparatus of claim 1, wherein a relationship between two reporting instances is indicated by the apparatus and includes whether the downlink transmission beams reported at different reporting instances can be received simultaneously by the apparatus.

3. The apparatus of claim 1, wherein the report information further includes indices and L1-RSRP information for the CSI-RSs.

4. The apparatus of claim 1, wherein group information is reported together with RSRP information.

5. The apparatus of claim 1, wherein different beams of the multiple downlink beams are simultaneously received by different UE antenna panels.

6. The apparatus of claim 1, wherein a one-bit indicator is used to indicate whether the downlink transmission beams reported at different reporting instances can be received simultaneously by the UE.

7. The apparatus of claim 1, wherein, for non-group based reporting, a relationship between two reporting instances is pre-defined or configured by higher layer signaling or downlink control information (DCI) or reported by the apparatus with an explicit indicator.

8. The apparatus of claim 1, wherein the processor is further configured to:
split uplink transmission beams into different groups;
generate uplink transmission beams together with group information for a transmit signal path; and
send the generated uplink transmission beams to the RF interface.

9. The apparatus of claim 8, wherein the group information is based on a UE antenna panel or an antenna port for simultaneous transmission.

10. The apparatus of claim 8, wherein, for non-group based operation, the processor is further configured to:
select uplink transmission beams based on at least one of:
a sounding reference signal resource indicator (SRI);
an indicator or an index; or
an index.

11. The apparatus of claim 5, wherein there are two downlink beams reported in group-based beam reporting, wherein each of the two downlink beams is received on a different one of the UE antennas panels.

12. A user equipment (UE), comprising:
at least one antenna;
a radio frequency (RF) interface in communication with the at least one antenna; and
a processor in in communication with the RF interface, wherein the processor is configured to cause the UE to:
receive, from a base station, an indication whether group-based beam reporting is indicated, wherein group-based beam reporting includes reporting multiple downlink beams that can be received simultaneously; and
generate report information for downlink transmission beams according to the indication, wherein, when group-based beam reporting is indicated, the report information includes indices and layer 1 reference signal received power (L1-RSRP) information of the multiple downlink beams that can be received simultaneously, and wherein, for non-group based reporting, the report information includes L1_RSRP information of a plurality of transmission beams for channel state information-reference signals (CSI-RSs) quasi-collocated with respective beams associated with synchronization signal blocks (SSBs).

13. The UE of claim 12, wherein a relationship between two reporting instances is indicated by the UE and includes whether the downlink transmission beams reported at different reporting instances can be received simultaneously by the UE.

14. The UE of claim 12, wherein the report information further includes indices and L1-RSRP information for the CSI-RSs.

15. The UE of claim 12, wherein different beams of the multiple downlink beams are simultaneously received by different UE antenna panels.

16. The UE of claim 15, wherein there are two downlink beams reported in group-based beam reporting, wherein each of the two downlink beams is received on a different one of the UE antennas panels.

17. An apparatus, comprising:
a memory interface; and
a processor in communication with the memory, wherein the processor is configured to:
transmit, to a user equipment device (UE), an indication whether group-based beam reporting is indicated, wherein group-based beam reporting includes reporting multiple downlink beams that can be received simultaneously; and
receive, from the UE, report information for the multiple downlink beams according to the indication, wherein, when group-based beam reporting is indicated, the report information includes indices and layer 1 reference signal received power (L1-RSRP) information of the multiple downlink beams that can be received simultaneously, and wherein, for non-group based reporting, the report information includes L1_RSRP information of a plurality of transmission beams for channel state information-reference signals (CSI-RSs) quasi-collocated with respective beams associated with synchronization signal blocks (SSBs).

18. The apparatus of claim 17, wherein different beams of the multiple downlink beams are simultaneously received by different UE antenna panels.

19. The apparatus of claim 18, wherein there are two downlink beams reported in group-based beam reporting, wherein each of the two downlink beams is received on a different one of the UE antennas panels.

20. The apparatus of claim 17, wherein, for non-group based reporting, a relationship between two reporting instances is pre-defined or configured by higher layer signaling or downlink control information (DCI) or reported by the UE with an explicit indicator.

* * * * *